United States Patent [19]
Kinnear

[11] 3,944,847
[45] Mar. 16, 1976

[54] ELECTRICAL DISCONNECT SWITCH

[76] Inventor: Joseph D. Kinnear, 5631 S. Sixth Ave., Countryside, Ill. 60525

[22] Filed: Dec. 7, 1973

[21] Appl. No.: 422,665

[52] U.S. Cl. ............... 307/131; 200/163; 200/325; 200/328
[51] Int. Cl.² ................................. H01H 13/68
[58] Field of Search........ 200/163, 325, 328, 153 R; 307/131

[56] References Cited
UNITED STATES PATENTS

| | | | |
|---|---|---|---|
| 1,105,485 | 7/1914 | Carlson | 200/159 R X |
| 2,299,250 | 10/1942 | Perbal | 200/328 X |
| 2,385,293 | 9/1945 | Logan | 200/325 X |
| 2,806,926 | 9/1957 | Rigert et al. | 200/163 X |
| 3,322,927 | 5/1967 | Waldorf et al. | 200/325 X |
| 3,392,598 | 7/1968 | Waldorf et al. | 200/328 X |

*Primary Examiner*—James R. Scott
*Assistant Examiner*—William J. Smith
*Attorney, Agent, or Firm*—Barnes, Kisselle, Raisch & Choate

[57] ABSTRACT

An electrical disconnect switch which includes a pair of fixed tubular conductors having tulip connectors mounted on the free ends thereof. The switch includes a pair of movable tubular conductors telescopically engageable with the tulip connectors for completing a circuit through the switch. The movable conductors are spring biased to an opened position and a latch is provided for retaining the movable conductors in a closed position. The switch also includes a solenoid connected across the fixed conductors and designed to operate a lever for blocking movement of the movable conductors to the closed position when a relatively high current is flowing through the solenoid.

21 Claims, 11 Drawing Figures

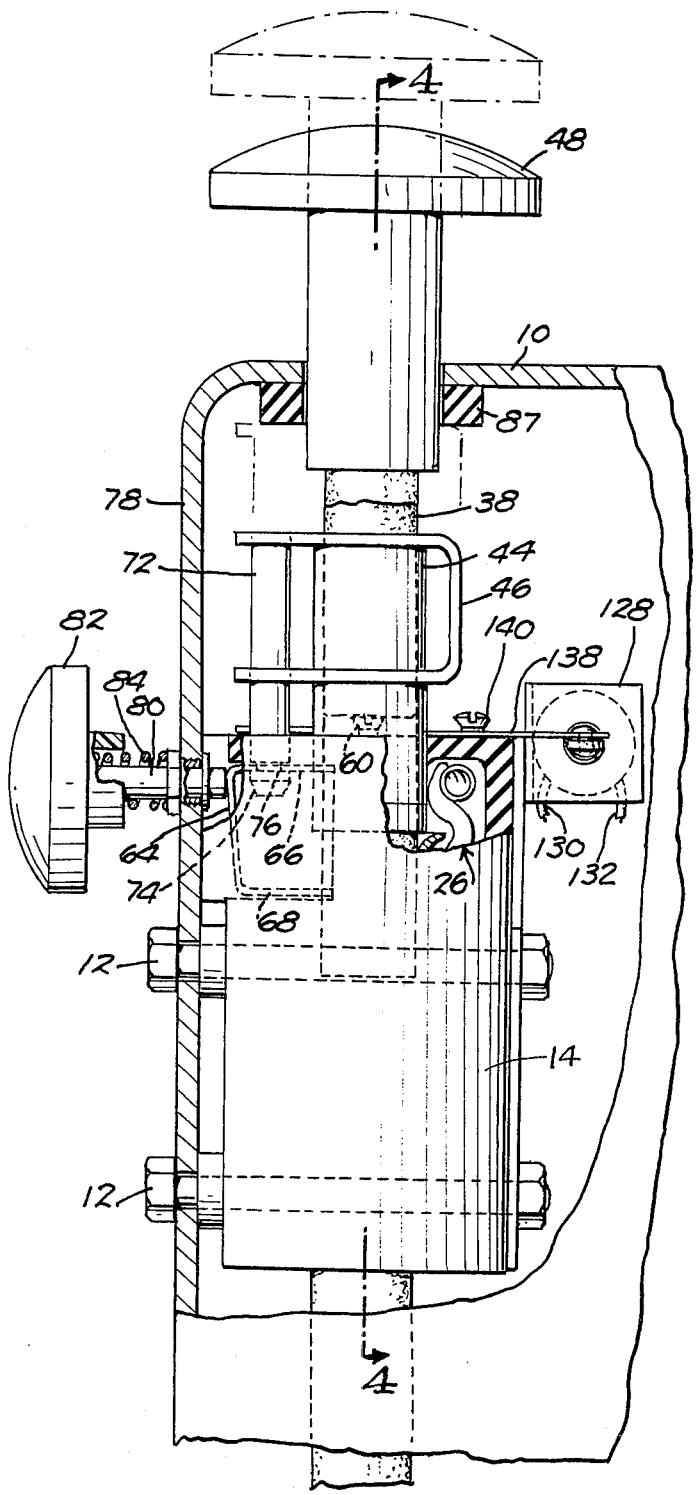
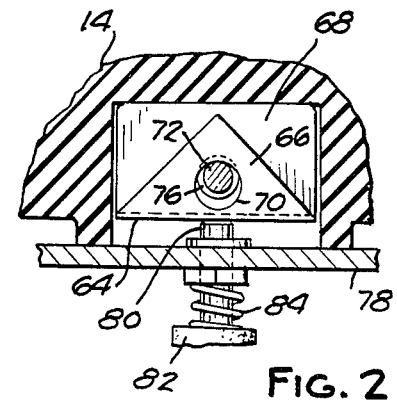
FIG. 2
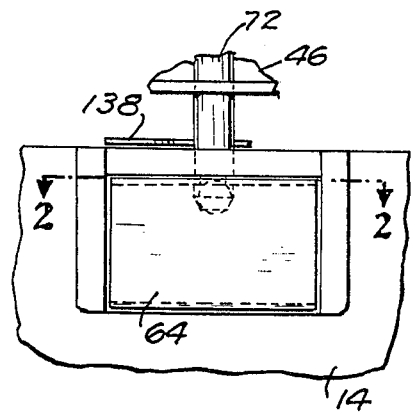
FIG. 3
FIG. 1

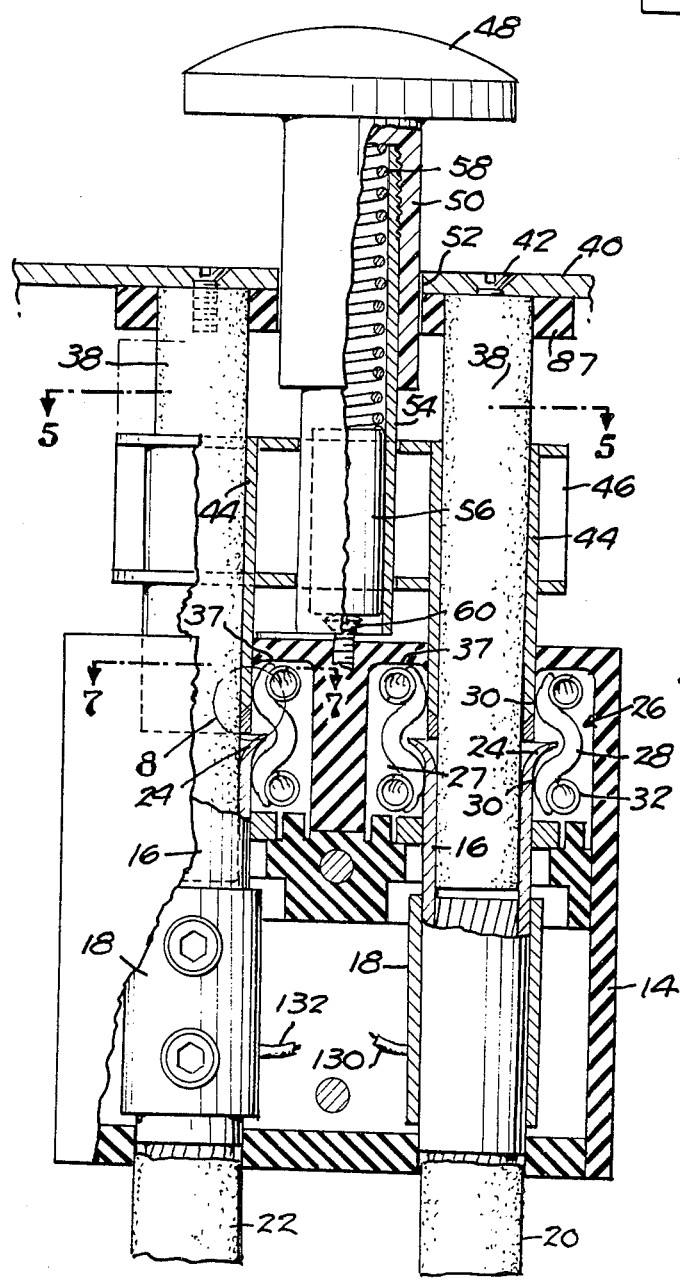
FIG. 4
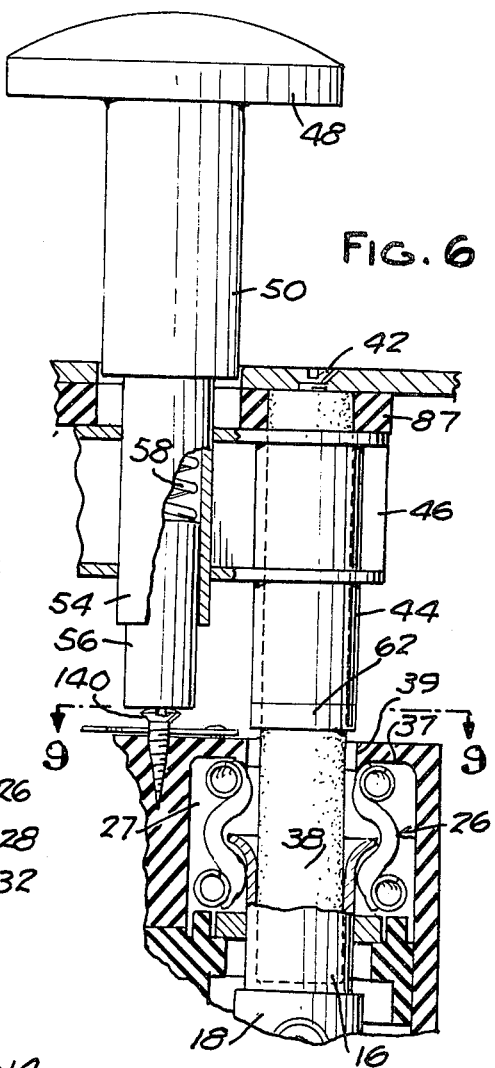
FIG. 6
FIG. 5
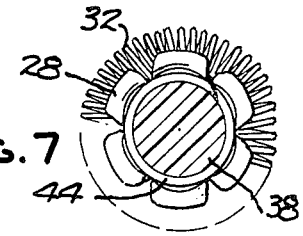
FIG. 7
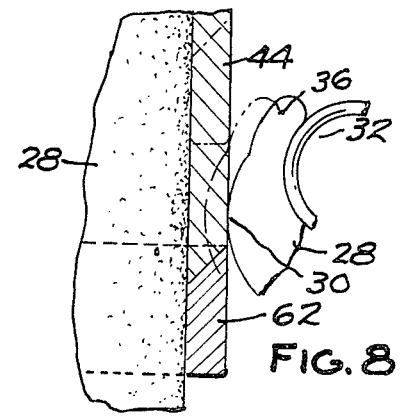
FIG. 8

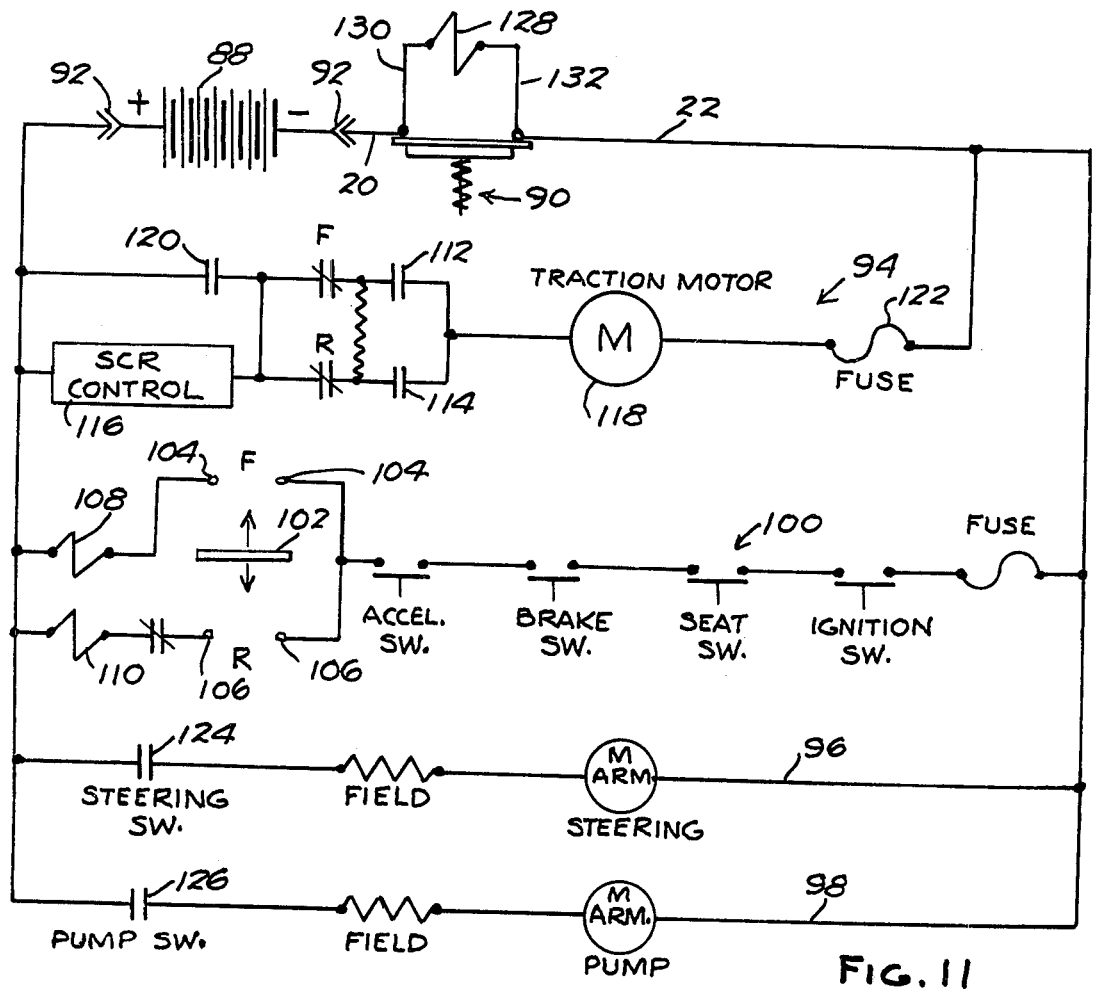

ELECTRICAL DISCONNECT SWITCH

This invention relates to an electrical power disconnect switch, and, more particularly, to a safety switch for instantaneously opening the power circuit of a battery-operated mechanism in the event of an emergency or otherwise.

While the switch of the present invention has numerous applications, it is especially useful in connection with battery-powered vehicles, such as industrial trucks used in manufacturing plants and warehouses for transporting and lifting loads. While the switch is also admirably suited for use with other battery operated apparatus, such as recreational vehicles, personnel carriers, hoists, lift platforms for workmen, etc., the invention is specifically shown and described in connection with a battery-operated industrial truck since the latter is a typical example of an application for which the invention is admirably suited.

Battery-operated vehicles of the type described normally employ power circuits to the various power components, such as the traction wheels, steering mechanism, lift mechanism, etc., and also control circuits for selectively energizing and de-energizing the desired power circuits. The power circuits normally include one or more contactors which open and close the power circuits in response to actuation of various operator-controlled switch members in the control circuit. In the conventional electrical circuit of such a vehicle the power circuits are connected to the battery in parallel with the control circuits.

Many problems associated with the use of battery-operated industrial trucks result from the lack of proper preventive maintenance. Such trucks are frequently operated under conditions where the electrical controls are exposed to constant vibration and an environment in which dirt, dust and grime are prevalent.

Likewise, it frequently happens that such vehicles are operated when the battery voltage is at a relatively low level, thus producing a relatively high current. When the battery voltage is low or the contactors are dirty or pitted and burned, the contactors sometimes weld shut when they close. When this occurs, since the power circuits are in parallel with the control circuits, the power circuits are maintained energized through the welded shut contactors. Under such circumstances the control circuits are ineffective to stop the operation of the vehicle itself or an auxiliary power device on the vehicle. Thus, if the contactors in the power circuit to the traction wheels should weld closed the supply of power to the traction wheels will be maintained even though the manual controls are manipulated in a manner which would normally stop the vehicle. Obviously such an occurence presents a dangerous situation which can result in serious injury to the operator and others and also extensive damage to property.

Such vehicles are rarely provided with a switch in series with the battery for quickly cutting off the supply of current to the power circuits. At the present time when switches are used they take the form of relatively large, expensive battery disconnect switches located on the vehicle so as to be lever-operated or otherwise actuated by the operator. Aside from their cost and size, the disadvantages of such disconnect switches reside in the fact that they are not readily operable in an emergency situation and, when operated, the relatively high current in the circuit produces substantial arcing as the switch contacts separate. Thus, when such switches are used, frequent replacement thereof is necessitated.

Furthermore, such conventionally used disconnect switches are designed so that they can be readily manipulated to reconnect the battery with the power circuit of the vehicle even though the malfunction which required initial opening of the switch has not been corrected. When such a switch is again closed without correcting the cause of the malfunction current is again supplied to the power circuits irrespective of the condition of the control circuit and a dangerous situation is again presented due to possibly welding the switch shut also and losing all means of killing power to the vehicle.

The present invention has for its primary object the provision of an electrical disconnect switch which overcomes the problems discussed above.

More specifically, it is an object of this invention to provide an electrical disconnect switch which is constructed such that when it is actuated to open the switch contacts are moving at a high velocity when they separate or break with one another and the contacts themselves are designed to produce a minimum of arcing, even when separating under high D.C. current conditions.

A further object of the present invention resides in the provision of a disconnect switch incorporating a current sensitive device for preventing the switch from being closed under conditions which would result in a large flow of current such as might occur when contactors in a power circuit are welded shut.

In general, the switch of the present invention comprises a first pair of fixed conductors adapted to be connected between a battery and the electrical circuit of a battery-operated mechanism and also a second pair of electrically connected movable conductors normally closing the circuit between the first pair of conductors and spring biased to open upon release of a mechanical latch. The conductors are of tubular shape and the switch includes tulip connectors of special design for establishing and breaking the circuit between the conductors and the contacts. In addition, the switch includes a solenoid-operated mechanism which prevents the switch from being closed under conditions which would result in the flow of a large current therethrough.

Other features and objects of the present invention will become apparent from the following description and drawings, in which:

FIG. 1 is a fragmentary sectional view with parts broken away of an electrical disconnect switch of the present invention;

FIG. 2 is a fragmentary sectional view of the latch mechanism taken along the line 2—2 in FIG. 3;

FIG. 3 is a fragmentary end elevational view of the latch mechanism;

FIG. 4 is a fragmentary sectional view of the switch taken along the line 4—4 in FIG. 1;

FIG. 5 is a sectional view along the line 5—5 in FIG. 4;

FIG. 6 is a fragmentary view similar to FIG. 4 and showing the switch in the open condition;

FIG. 7 is a fragmentary end view along the line 7—7 in FIG. 4;

FIG. 8 is a fragmentary view on an enlarged scale of the circled portion designated 8 in FIG. 4;

FIG. 9 is a sectional view along the line 9—9 in FIG. 6;

FIG. 10 is a sectional view along the line 10—10 in FIG. 9 with the blocking lever actuated to a position to prevent closing of the switch; and FIG. 11 is a simplified electrical circuit diagram of an industrial truck embodying the disconnect switch of the present invention.

Referring to the drawings, numeral 10 designates the housing in which the switch components are located. Within housing 10 there is mounted, as by bolts 12, a generally hollow support block 14 formed of an electrical insulating material. A pair of copper sleeves 16 are fixedly mounted in support block 14 in any suitable manner. The two copper sleeves 16 are arranged in parallel relation and are adapted to be connected at one end by suitable connector elements 18 with electrical cables 20, 22. In the case of an industrial truck one of these cables would extend to a battery terminal and the other would be connected to the electrical system of the truck. The other end of each sleeve 16 is flared outwardly as at 24. The flared end 24 of each sleeve 16 is adapted to retain a tulip connector 26 thereon. Tulip connector 26 is constructed in the manner disclosed in my co-pending application, Ser. No. 245,138, filed Apr. 18, 1972, now U.S. Pat. No. 3,813,638.

Each tulip connector 26 comprises a series of petals 28 of identical shape and size arranged circumferentially around sleeve 16 within a suitable cavity 27 in block 14. Petals 28 are curved outwardly adjacent their opposite ends as at 30, the outwardly curved portions forming seats for coiled tension springs 32 which encircle and tend to maintain the series of petals in a circumferentially contracted condition. The axially central portion of each petal 28 is bowed outwardly as at 34 to accommodate the outwardly flared portion 24 of sleeve 16 and prevent the tulip connectors from being axially withdrawn from sleeve 16. As disclosed in my aforesaid co-pending application and as illustrated in FIG. 8, the outwardly turned portion 30 of each petal 28 has a free end portion 36 of lesser thickness than the curved portion 30. As shown in FIG. 7, each petal 28 is curved in transverse section to a radius less than that of sleeve 16 so that each petal has two points of contact with sleeve 16 at the curved portion 30 thereof. Each cavity 27 has a jig-ground annular flat face 37 against which the end portions 36 of the petals are adapted to abut when the tulip connectors are shifted upwardly as viewed in FIG. 6.

A pair of cylindrical electrically insulating pins 38 extend at one end through concentric openings 39 in block 14 and into the flared ends of sleeves 16 and have a close fit therewith. The opposite ends of insulating pins 38 are fixedly attached to wall 40 of housing 10 by screws 42. A second pair of copper sleeves 44 are fixedly attached to a cross head 46 and have a close sliding fit with pins 38. Cross head 46 is preferably in the form of a rigid U-shaped bracket formed of copper or the like which electrically interconnects the two sleeves 44. A push knob 48 which is formed of an insulating material has a hollow cylindrical shank 50 extending through an opening 52 in wall 40 of housing 10. Within shank 50 there is threaded a metal sleeve 54. Sleeve 54 is fixedly attached as by a press fit, silver solder, etc. to cross head 46. A plunger 56 slideably arranged within sleeve 54 is biased in a direction outwardly of the sleeve by a relatively heavy compression spring 58. Spring 58 biases plunger 56 so that its lower end abuts against the head of screw 60 on the top face of support block 14.

FIG. 6 shows the switch in the open condition wherein the lower ends of sleeves 44 are separated and spaced from tulip connnectors 26. The free lower end of each sleeve 44 preferably has mounted thereon a ring 62 of an electrically conducting material which is relatively hard and tends to resist arcing. Rings 62 are preferably formed from such alloys as copper-tungsten or beryllium-copper. Rings 62 should preferably be formed of a material having higher electrical resistance than sleeves 44.

In FIG. 4 the switch is shown in the closed condition with spring 58 compressed and push knob 48 in the depressed condition. When the switch is in this closed condition the leading ends of sleeves 44 extend through openings 39 and are telescoped within tulip connectors 26. It will be observed that the curved ends 30 of the petals 28 of each tulip connector are contacting sleeves 44 beyond the anti-arcing rings 62. In the condition of the switch components shown in FIG. 4 sleeves 44 and cross head 46 connect sleeves 16 and, thus, cables 20, 22 in series.

Referring now to FIG. 1, within a suitable cavity in support block 14 there is arranged a U-shaped latch spring 64 having generally horizontally disposed upper and lower legs 66, 68, respectively. The upper leg 66 of spring 64 is fashioned with an opening 70. A shot pin 72 fixed on cross head 46 and projecting vertically downwardly from the cross head has a tapered lowered end 74. Pin 72 is also fashioned with an annular groove disposed between the tapered end 74 and cross head 46. Opening 70 in the upper leg 66 of spring 64 has a diameter slightly larger than pin 72. However, spring 64 is formed such that in its untensioned condition opening 70 is slightly off-center relative to the axis of pin 72. When cross head 46 is shifted downwardly a predetermined extent the tapered end 74 of pin 72 engages opening 70 and flexes spring 64 so that the upper leg 66 thereof is displaced horizontally inwardly away from side wall 78 of housing 10. As the cross head continues to move downwardly a position is reached wherein the upper leg 66 of spring 64 registers with groove 76 and the tension in spring 64 is thus relieved to permit the edge of opening 70 to engage groove 76 and thus latch cross head 46 in the lowered position against the bias of spring 58. When cross head 46 is in the lowered latch position the switch is closed; that is, sleeves 44 are telescoped within tulip connectors 26 (FIG. 4).

Latch spring 64 is adapted to be released by a pin 80 slideably mounted on wall 78 of housing 10 and having a push knob 82 at the outer end thereof. A compression spring 84 biases knob 82 in an outward direction to the position limited by the engagement of a flange 86 on pin 80 with the inner side of wall 78. When knob 82 is pressed inwardly toward wall 78 the inner end of pin 80 engages spring 64 to shift the upper leg 66 thereof horizontally to a position wherein the opening 70 is disengaged from groove 76 and permits the entire cross head assembly to shift upwardly under the bias of spring 58. The upward movement of the cross head assembly is limited by a rubber bumper pad 87 on the inner side of the housing top wall 40.

As is shown in FIG. 6, the legend OFF may be suitably applied to the lower end of shank 50 to visibly indicate the condition of the switch. When the switch is ON the legend is disposed such as to be concealed by wall 40 of housing 10.

Spring 58 is preferably a relatively heavy spring. It will be observed that when the switch is in the closed position shown in FIGS. 1 and 4 the rounded ends 30 of tulip connectors 26 are engaging sleeves 44 above the lower ends thereof. As shown in the drawings (FIGS. 1, 4 and 8), the extreme end portions of sleeves 44 (that is, the free ends of rings 62) are disposed axially at about the axial central sections of tulip connectors 26. Thus, cross head 46 and sleeves 44 move upwardly through a predetermined distance before the series circuit connection between cables 20, 22 and sleeves 44 is broken. Since spring 58 is a relatively heavy one and since the cross head assembly is of relatively small mass, it follows that at the instant the circuit is broken sleeves 44 are moving upwardly at a relatively high velocity. This tends to reduce arcing to a minimum. Arcing is also reduced to a minimum by reason of the shape of petals 28 and the provision of the rings or tips 62 at the free ends of sleeves 44.

As pointed out previously and as shown in FIG. 7, each petal is curved in transverse section so that it has two points of contact with the outer surface of sleeves 44. Thus, as shown in the drawings, if each tulip connector has six petals and all of the petals are accurately located axially relative to the ends of sleeves 44, then, when sleeves 44 move upwardly out of contact with the petals, the circuit is broken at 12 individual points on each connector or a total of twenty-four circuit breaking points on both sleeves 44. Obviously, if the circuit is broken simultaneously at 24 point rather than one, substantially less arcing occurs. When sleeves 44 move upwardly the free end portions 36 of petals 28 are all axially aligned in the same axial plane by reason of their abutment with the jig-ground flat faces 37 of cavities 27. This insures breaking the circuit simultaneously at all of the petals. In addition, since the rings 62 are preferably formed of a material having a higher resistance than the copper sleeves 44, it follows that as the sleeves move upwardly the current flowing through the switch is reduced as the rounded end portions 30 of the petals engage rings 62 and upon complete separation less arcing occurs because at the instant of separation the current has a lesser value. Thus, a minimum of arcing occurs when the switch is open because sleeves 44 are moving at a high velocity, because the current has a reduced value, and because the circuit is broken simultaneously at a relatively large number of contact points.

Referring now to FIG. 11, there is illustrated in a diagrammatic and simplified manner that much of the electrical circuitry of an industrial truck which illustrates another important feature of the disconnect switch of this invention. In the diagram shown in FIG. 11 the battery for supplying power to the vehicle is designated 88 and the switch previously described is schematically designed 90. The battery connectors are indicated at 92. One of the cables 20, 22 shown in FIG. 4 is connected to the battery and the other connects with the power and control circuits of the vehicle. In the electrical system illustrated in FIG. 11 three power circuits are shown; namely, the power circuit 94 to the wheel traction motor, the power circuit 96 to the steering mechanism and the power circuit 98 to the lift mechanism. The electrical system also includes a control circuit 100 connected to the battery in parallel with the power circuits. Control circuit 100 includes the conventional ignition, dead-man seat, brake and accelerator switches illustrated in FIG. 11 as well as a manual directional control 102 for closing a circuit between the forward contacts 104 and the reverse contacts 106. Contacts 104 and 106 when closed energize solenoids 108 and 110, respectively, which in turn close contactors 112, 114 in power circuit 94. An SCR control 116 in power circuit 94 is operative only when the traction motor 118 is operating at less than full speed. Once the traction motor is operating under full speed the main contactor 120 closes and the SCR control 116 is no longer performing a controlling function.

As is conventional, power circuit 94 also includes a fuse 122 which, in the case of an industrial truck, may have a rating on the order of 350 amperes (which is slightly higher than the current to the traction motor at full load). The steering circuit 96 also includes a contactor 124 which is closed for power steering the vehicle and the power circuit 98 for the lift mechanism likewise includes a contactor 126 which is manually closed when it is desired to operate the lift mechanism. Except for the switch 90, the arrangement shown in FIG. 11 is more or less conventional.

With this arrangement it will be observed that the power circuits 94, 96, 98 are connected to the battery in parallel with the control circuit 100. Thus, if a contactor in one of these power circuits should become welded shut, the manipulation of the control switches in the control circuit 100 will be ineffective to cut off the supply of power to the power circuit having the welded shut contactor. With the switch 90 connected into the circuit as illustrated, when this occurs push knob 82 is depressed to instantaneously cut off the supply of power to all of the circuits of the vehicle.

In the event of a malfunction as described, if the electrical system is not serviced to correct the malfunction and switch 90 is again closed, current would again be supplied to the power circuit containing the welded shut contactor and a dangerous situation would again be presented. In order to prevent such occurence, the switch of this invention is provided with a means for preventing it from being again closed until the malfunction is corrected. These means are in the form of a solenoid 128 mounted on insulating block 14 as shown in FIG. 1. The coil of solenoid 128 has its opposite ends connected across the two cables 20, 22 as indicated by the leads 130, 132 in FIGS. 1 and 4. The plunger or armature 134 of solenoid 128 is biased in a direction outwardly of the coil by a light tension spring 136. The outer end of plunger 134 is pivotally connected to one end of a lever 138 pivoted intermediate its ends on support block 14 as by a screw 140. The opposite end 142 of lever 138 is designed so that, when solenoid 128 is energized to retract plunger 134 against the bias of spring 136, the lever is pivoted about screw 140 in a counter-clockwise direction as viewed in FIG. 9 from the position shown in solid lines to the broken line position so that it overlies and blocks the opening 144 in support block 14 through which the shot pin 72 has to pass in order to interengage sleeves 44 with tulip connectors 26. An intermediate portion of lever 138 is provided with a notch 146 to accommodate screw 60 against which the lower end of plunger 56 is biased by spring 58.

The coil of solenoid 128 is a high resistance coil so that it is actuated only when switch 90 is open. For example, if the battery voltage is 36 volts, when switch 90 is open the current through the solenoid may be on the order of 0.23 amperes, which is sufficient to powerfully close the solenoid but not sufficient to operate any of the power devices in the power circuits. However, when switch 90 is closed, solenoid 128 is in shunt relation with the conductor defined by sleeves 44 and cross head 46 and is effectively shorted out of the circuit. Hence, if one of the contactors in any of the power circuits becomes welded shut and the operator is unable to stop the operation of the mechanism controlled by the malfunctioning power circuit, he merely depresses knob 82 on housing 10 which, as pointed out previously, disengages the spring latch 64 and causes the cross head 46 with the sleeves 44 mounted thereon to slide upwardly out of engagement with the tulip connectors 26 under the influence of the high tension spring 58. When this occurs the circuit between cables 20, 22 is closed through solenoid 128 which causes plunger 134 to retract and pivot lever 138 to the broken line position shown in FIG. 9 wherein the end 142 thereof blocks the opening 144 in support block 14 to thereafter prevent the switch from being closed by depressing knob 48. However, in the event of such a malfunction, when the welded shut contactor is repaired or replaced, the circuit across solenoid 128 is de-energized which causes spring 136 to pivot lever 138 to the full line position shown in FIG. 9. Thereafter the switch can be closed and latched in the closed position by merely depressing knob 48 to a position wherein the groove 76 in shot pin 72 is engaged by the edge of opening 70 in the upper leg 66 of spring latch 64.

I claim:

1. An electrical disconnect switch comprising a housing having a first pair of rigid electrical conductors of cylindrical shape fixedly mounted therein in spaced parallel relation, a circumferentially resiliently flexible connector sleeve mounted on the end of each of said conductors, a cross head mounted in said housing for reciprocation along an axis parallel to said first pair of conductors, a second pair of conductors of cylindrical shape fixedly mounted on said cross head in spaced parallel relation for interengagement with said connector sleeves when the cross head is moved toward said first pair of conductors, said second pair of conductors being connected in series so that when the second pair of conductors engage with said connector sleeves a series circuit is established between the first pair of conductors through the second pair of conductors, manually operable means for moving said cross head toward said first pair of conductors to interengage the second pair of conductors with said connector sleeves, means biasing said cross head in a direction away from said connector sleeves to disengage the second pair of conductors therefrom, and manually releasable latch means for retaining the cross head in a position wherein the second pair of conductors engage with said connector sleeves and adapted when released to shift the cross head with a snap action to a position wherein the second pair of conductor disengage from the connector sleeves.

2. An electrical disconnect switch as called for in claim 1 wherein said latch means is spring-biased toward latching engagement with said cross head.

3. An electrical disconnect switch as called for in claim 1 including manually operable means mounted on said housing exteriorly thereof for releasing said latch means.

4. An electrical disconnect switch as called for in claim 1 wherein said first and second pair of conductors are coaxially aligned.

5. An electrical disconnect switch as called for in claim 4 wherein said connector sleeves comprise a tulip connector mounted on the ends of the first pair of conductors.

6. An electrical disconnect switch as called for in claim 5 wherein each of said tulip connectors comprises a plurality of petals arranged circumferentially in side-by-side relation with spring means circumscribing the petals to retain them in a circumferentially contracted condition.

7. An electrical disconnect switch as called for in claiam 6 wherein the ends of said petals facing the cross head are flared radially outwardly and are accurately located in the same axial plane so that all of said petals break with the movable conductors substantially simultaneously when the latch means is released.

8. An electrical disconnect switch as called for in claim 4 wherein each of said conductors is of tubular shape and including a non-conductive pin within each of said movable conductors having a close sliding fit therein, said non-conducting pins extending into each of the conductors of the first pair with a close fit and being fixed in said housing in spaced parallel relation whereby to serve as a guide for the reciprocating movement of said cross head.

9. An electrical disconnect switch as called for in claim 8 wherein the end portion of each movable conductor engageable with the connector sleeve is formed of a material which is substantially less electrically conductive than the movable conductors and which resists arcing.

10. An electrical disconnect switch as called for in claim 1 including means for preventing movement of said cross head to a position wherein the movable conductors interengage with said connector sleeves, said means comprising a member movable between two positions, said member in one of said positions blocking movement of the cross head to said circuit closing position, and means for moving said member comprising a current sensing means connected across said first pair of conductors and responsive to the flow of a relatively large current therethrough for shifting said member to said cross head blocking position.

11. An electrical disconnect switch as called for in claim 10 wherein said movable member comprises a pivotally mounted lever.

12. An electrical disconnect switch as called for in claim 11 wherein said cross head includes a shot pin engageable by said latch means and said lever when actuated by said current sensing means is adapted to pivot in a position lying in the path of travel of said shot pin to prevent interengagement of said shot pin with said latch means.

13. An electrical disconnect switch as called for in claim 12 wherein said current sensing means comprises a solenoid having a movable armature connected with said lever.

14. In a battery operated vehicle which includes a power circuit for transmitting current from a battery to an electrically operated motor on the vehicle, said power circuit having contactor means therein for closing the power circuit, the improvement which comprises, a manually operable switch mounted on the vehicle and having a pair of conductors at least one of which is movable to make and break with the other conductor to connect and disconnect the battery with the power circuit, means on said switch for blocking movement of the movable conductor in a direction to make with the other conductor and thereby prevent connection of the power circuit with said battery, said blocking means including a current sensing means and a blocking member operatively connected with the current sensing means, said blocking member when operated by the current sensing means preventing movement of the movable conductor to make with the other conductor, said current sensing means connecting said battery and power circuit in series and being responsive to the flow of at least a predetermined current therethrough to operate said blocking member, whereby, when said switch is opened and said contactor means remain closed, current flows from the battery to the power circuit through said current sensing means to operate said blocking member and thereby prevent closing of said switch.

15. The improvement called for in claim 14 wherein said current sensing means is connected in parallel with said switch.

16. The improvement called for in claim 14 including an element movable in a predetermined path in response to movement of the movable conductor in the direction to make with the other conductor, said blocking member when operated by the current sensing means being moved into the path of travel of said movable element to block movement of the latter.

17. The improvement called for in claim 16 wherein said movable element forms part of a latch mechanism for latching said conductors in the make position.

18. The improvement called for in claim 17 wherein said movable conductor is spring biased to move in the direction for breaking with the other conductor and including manually operable means for releasing said latch mechanism to cause said conductors to break.

19. The improvement called for in claim 16 wherein said movable element comprises a pin mounted to move with the movable conductor and said blocking member comprises a lever pivotally mounted on said switch for preventing movement of said pin when the current sensing means is energized.

20. The improvement called for in claim 14 wherein said current sensing means comprises a solenoid.

21. The improvement called for in claim 20 including spring means normally biasing said lever to a non-blocking position so that when the solenoid is actuated it overcomes the bias of said spring.

* * * * *